United States Patent
Olivan Bescos et al.

(10) Patent No.: US 11,409,422 B2
(45) Date of Patent: Aug. 9, 2022

(54) DEVICE, SYSTEM AND METHOD FOR INTERACTING WITH VESSEL IMAGES

(71) Applicant: KONINKLIJKE PHILIPS N.V., Eindhoven (NL)

(72) Inventors: Javier Olivan Bescos, Eindhoven (NL); Raoul Florent, Ville d'Avray (FR); Romane Isabelle Marie-Bernard Gauriau, Paris (FR); Christian Haase, Hamburg (DE); Michael Grass, Hamburg (DE); Vincent Maurice Andre Auvray, Meudon (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 94 days.

(21) Appl. No.: 16/955,824

(22) PCT Filed: Dec. 11, 2018

(86) PCT No.: PCT/EP2018/084256
§ 371 (c)(1),
(2) Date: Jun. 19, 2020

(87) PCT Pub. No.: WO2019/121128
PCT Pub. Date: Jun. 27, 2019

(65) Prior Publication Data
US 2020/0341622 A1    Oct. 29, 2020

(30) Foreign Application Priority Data
Dec. 20, 2017    (EP) .................................... 17306839

(51) Int. Cl.
*G06F 3/04845*    (2022.01)
*G06T 7/187*    (2017.01)
(Continued)

(52) U.S. Cl.
CPC ........ *G06F 3/04845* (2013.01); *G06F 3/0488* (2013.01); *G06T 7/13* (2017.01);
(Continued)

(58) Field of Classification Search
CPC ... G06F 3/04845; G06F 3/0488; G06T 7/187; G06T 7/13; G06T 7/149; G06T 2200/24; G06T 2207/20092; G06T 2207/30101
(Continued)

(56) References Cited

U.S. PATENT DOCUMENTS 9,761,006 B2 * 9/2017 Bergner .................. G06T 7/136
10,198,165 B2 * 2/2019 Wu ........................ A61B 6/463
(Continued)

FOREIGN PATENT DOCUMENTS

DE    10312193 A1    9/2004
EP    2000894 A2    12/2008
(Continued)

OTHER PUBLICATIONS

PCT/EP2018_084256, ISR & WO, dated Jan. 16, 2019, 14 Page Document.

*Primary Examiner* — William D Titcomb (57) ABSTRACT

The present invention relates to a device for interacting with vessel images, the device (14) comprising: an interface unit (22); a processing unit (20); wherein the interface unit (22) comprises: a display (21); and an input setup (23); wherein the display (21) is configured to display a vessel image (24); wherein the input setup (23) is configured to receive a user input in relation to the vessel image (24); wherein the processing unit (20) is configured to: determine, for at least one vessel (26) in the vessel image (24), a vessel contour (30); determine, from the user input, an identifier position (36) in the vessel image (24); indicate at least a portion (38) of the vessel contour (30) in the vessel image (24), if the (Continued)

determined identifier position (36) is spaced apart from the vessel contour (30) by a distance (37) within a predefined distance range; determine, from the user input, a drag direction (42); and move the indicated portion (38) along the vessel contour (30) based on the determined drag direction (42).

16 Claims, 4 Drawing Sheets

(51) Int. Cl.
| | | |
|---|---|---|
| | *G06T 7/13* | (2017.01) |
| | *G06T 7/149* | (2017.01) |
| | *G06F 3/0488* | (2022.01) |
| | *G06F 3/0354* | (2013.01) |

(52) U.S. Cl.
CPC .............. *G06T 7/149* (2017.01); *G06T 7/187* (2017.01); *G06F 3/03543* (2013.01); *G06F 3/03545* (2013.01); *G06T 2200/04* (2013.01); *G06T 2200/24* (2013.01); *G06T 2207/10081* (2013.01); *G06T 2207/10088* (2013.01); *G06T 2207/10104* (2013.01); *G06T 2207/10108* (2013.01); *G06T 2207/10116* (2013.01); *G06T 2207/20092* (2013.01); *G06T 2207/30101* (2013.01)

(58) Field of Classification Search
USPC .......................................................... 715/769
See application file for complete search history.

(56) References Cited

U.S. PATENT DOCUMENTS

| | | | |
|---|---|---|---|
| 10,535,149 B2 * | 1/2020 | Elenbaas | H04N 7/181 |
| 10,631,825 B2 * | 4/2020 | Lee | A61B 8/463 |
| 10,849,583 B2 * | 12/2020 | Maeda | G06T 7/0014 |
| 10,898,267 B2 * | 1/2021 | Schmitt | A61B 5/0033 |
| 11,096,668 B2 * | 8/2021 | Lee | A61B 8/465 |
| 2014/0146076 A1 | 5/2014 | Kim et al. | |
| 2015/0099968 A1 * | 4/2015 | Jamello | A61B 5/0066 600/425 |
| 2015/0104085 A1 | 4/2015 | Schilling et al. | |
| 2016/0224229 A1 | 8/2016 | Jo et al. | |
| 2017/0148180 A1 * | 5/2017 | Elenbaas | A61B 5/055 |
| 2017/0193658 A1 * | 7/2017 | Cardinal | G06T 7/143 |
| 2017/0206662 A1 * | 7/2017 | Wang | G06T 7/143 |
| 2018/0211387 A1 * | 7/2018 | Wang | A61B 5/7405 |
| 2019/0038356 A1 * | 2/2019 | Schmitt | A61B 5/6898 |

FOREIGN PATENT DOCUMENTS

| | | |
|---|---|---|
| WO | 2008047266 A2 | 4/2008 |
| WO | 2017117389 A1 | 7/2017 |

* cited by examiner

DEVICE, SYSTEM AND METHOD FOR INTERACTING WITH VESSEL IMAGES

CROSS-REFERENCE TO PRIOR APPLICATIONS

This application is the U.S. National Phase application under 35 U.S.C. § 371 of International Application No. PCT/EP2018/084256, filed on Dec. 11, 2020, which claims the benefit of European Patent Application No. 17306839.6, filed on Dec. 20, 2017. These applications are hereby incorporated by reference herein.

FIELD OF THE INVENTION

The present invention relates to a device, a system and a method for interacting with vessel images.

BACKGROUND OF THE INVENTION

X-ray imaging devices, e.g. X-ray angiography devices, provide a minimally invasive way to inspect a patient's vasculature. A diagnose of the patient may be performed by visually inspecting the acquired X-ray images. Computers may be incorporated to the X-ray imaging devices to analyze the X-ray images and provide additional information. The users, e.g. clinicians, may interact with the computer programs on those computer to edit or amend the X-ray images.

For the clinician, it is important to be able to interact with the computer programs in a way that does not interfere with the workflow, e.g. during a surgery. Touch interfaces, such as tablets, provide a convenient way to implement the editing of X-ray images into the workflow. Touch interfaces may be fixed next to the operation table. They may further be used under a sterile transparent cover, and they allow for intuitive interactions like other applications present in smartphones, like zooming, panning, etc.

US 2014/0146076 A1 describes an apparatus including an interface unit and a contour modification unit. The contour modification unit is configured to modify a contour which is displayed on a display, wherein the modification is based on a user-selected mode from one or more modes, and an operation by a user. However, the task of delineating or correcting vessel contours is very specific to a medical setup. It requires much more accuracy than common tasks like zooming or panning, and in addition, it needs to be intuitive, easy, effective, and efficient. The need for high accuracy is hampered by the fact that touch actions are performed with the finger of the user.

According to WO 2017/117389, image segmentation can include a pre-initialization image analysis of image data using an image analysis algorithm to generate a modified image, and the modified image can be presented on a display. An initialization can be performed on the modified image that includes user input on the modified image. The modified image can be segmented using a segmentation algorithm that evaluates the user input. Upon evaluating the user input, the segmentation algorithm can cause a segmented image to be produced which can be presented on the display.

EP 2 000 894 A1 relates to a computer implemented method for initiating floating controls via a touch sensitive device, the method comprising: detecting the presence of an object on the touch sensitive device; recognizing the object; and generating a user interface element on the touch screen in the vicinity of the object based on the recognized object.

SUMMARY OF THE INVENTION

There may thus be a need to provide a device or method which improves the interaction with vessel images.

The object of the present invention is solved by the subject-matter of the independent claims; further embodiments are incorporated in the dependent claims. It should be noted that the following described aspects of the invention apply also for the system, the method, the computer program element, and the computer readable device.

According to the present invention, a device for interacting with vessel images is provided, the device comprising: an interface unit; a processing unit; wherein the interface unit comprises: a display; and an input setup; wherein the display is configured to display a vessel image; wherein the input setup is configured to receive a user input in relation to the vessel image; wherein the processing unit is configured to: determine, for at least one vessel in the vessel image, a vessel contour; determine, from the user input, an identifier position in the vessel image; indicate at least a portion of the vessel contour in the vessel image, if the determined identifier position is spaced apart from the vessel contour by a distance within a predefined distance range; determine, from the user input, a drag direction; and move the indicated portion along the contour based on the determined drag direction.

The display of the interface unit thus displays a vessel image to a user. The processing unit examines the vessel image for a vessel contour. In an example, the display may indicate a portion of the determined vessel contour in the vessel image.

In an example, the indication may be a line being overlaid on the vessel image. In another example, the indication may be a change of color or a frame, etc.

In an example, the indicated contour portion describes the complete contour of a vessel.

In a further example, the vessel may be represented by a reformatted vessel in the image, a vessel centreline may be represented by a reformatted vessel centreline in the image, and a vessel contour may be represented by a reformatted vessel contour.

The user who may for example be a surgeon may examine the determined displayed vessel contour and check whether the determined vessel contour is accurate. A correction of the determined vessel contour may be performed by using the input setup. The user may provide a position in the vessel image by defining an identifier position with an identifier on the vessel image. If the input setup is for example a touch screen, the identifier may be a finger touching the touch screen.

The processing unit may consider the user input as start of the interaction with the vessel contour if the identifier position is spaced apart from the vessel contour in the vessel image by a distance within a predefined distance range. The required distance between the identifier position and the vessel contour avoids an occlusion of the vessel and the vessel contour in the vessel image. The predefined distance range may therefore ensure that an identifier position inside a vessel will not be determined as start of the interaction with the vessel image.

When the processing unit determines an identifier position that is spaced apart from the determined vessel contour, the processing unit will indicate a portion of the determined vessel contour in the vessel image. That indicated portion shows the user the portion of the vessel contour which may be corrected.

The user may change the position of the portion along the vessel contour by inputting a drag interaction. The processing unit determines the drag direction of the user input and moves the indicated portion along the contour based on the determined drag direction.

The device improves the accuracy of the interaction with the vessel contour of the vessel image since the identifier does not block the view on the vessels, the determined vessel contour, or the indicated portion in the vessel image. The user may then perform modifications to the vessel contour with high accuracy since the user can always see the amended objects in the vessel image.

According to an example, the processing unit is further configured to: move the indicated portion along the vessel contour while an angle between the determined drag direction and the indicated portion is within a first predefined angle range.

The first predefined angle range avoids inaccurate movement of the indicated portion along the vessel contour. Furthermore, the first predefined angle range covers only a portion of the full circle such that further angle ranges for further interaction modes with the vessel contour may be defined. This further ensures a clear determination of the drag direction. Thus, the accuracy of the interaction with the vessel image is further improved.

According to an example, the first predefined range ranges from +45° to −45° and +135° to −135°, preferably from +30° to −30° and +150° to −150°, more preferably from +15° to −15° and +165° to −165°, most preferably at 0° and 180°. In other words, in this example, the drag direction is parallel to the indicated contour portion.

According to an example, the processing unit is further configured to deform the vessel contour at the indicated portion while the angle between the drag direction and the indicated portion is within a second predefined angle range, resulting in a deformed indicated portion of the vessel contour in the image.

The deformation of the vessel contour provides an intuitive way to interact with the vessel image to amend the vessel contour at and/or around the position of the indicated portion. The user may amend the vessel contour such that the vessel contour fits to the vessel in the vessel image. The second predefined angle range provides a further interaction mode in addition to the movement of the indicated portion along the vessel contour.

In an example, the user may also directly deform the vessel contour without moving the indicated portion along the vessel by inputting a drag direction which has an angle with the vessel contour that is in the second predefined angle range right after the indicated portion is provided by the processing unit.

According to an example, the second predefined angle range ranges from +45° to +135° and from −45° to −135°, preferably from +30° to +120° and from −30° to −120°, more preferably from +15 to +105° and from −15° to −105°, most preferably at +90° and at −90. In other words, in this example, the drag direction is perpendicular to the indicated contour portion.

According to an example, the processing unit is further configured to move the deformed indicated portion along the vessel contour in the image while the angle between the drag direction and the indicated portion is within a first predefined range after deforming the vessel contour. That is, when, after a perpendicular drag by which the indicated contour portion has been deformed, the drag direction changes to a direction parallel to the indicated contour portion, the deformed indicated portion is moved along the vessel contour.

This provides a further interaction with the vessel image wherein the user may move the deformed indicated portion to accurately position the deformed indicated portion of the vessel contour in the vessel image. This further improves the accuracy of the interaction with the vessel image.

According to an example, the processing unit is further configured to increase a length of the indicated contour portion with a predefined growth rate before determining the drag direction.

This provides the interaction to amend the size of the indicated portion at the initiation of the interaction process. Due to the amendment of the size, a user can adapt the size of the indicated portion such that the indicated portion fits to a region of the determined vessel contour that shall be corrected. This further increases the accuracy of the interaction process.

According to an example, a period of increasing the length begins with the detection of the identifier position and ends with the detection of the drag direction.

This provides an intuitive way to increase the length of the indicated portion.

According to an example, the interface unit is a touch screen, wherein the user input takes place by a touch interaction on the display within the vessel image.

According to an example, the input setup is a mouse, and/or an electronic pen.

According to an example, the predefined distance range ranges from 1 mm to 50 mm, preferably from 2 mm to 40 mm, more preferably from 3 mm to 30 mm, most preferably from 4 mm to 20 mm.

According to an example, the processing unit is further configured to replace a vessel in the image by a reformatted vessel, a vessel centreline by a reformatted vessel centreline, and/or the vessel contour by a reformatted vessel contour.

In an example, the processing unit is further configured to straighten a curvilinear reformatting of vessel anatomy.

According to the present invention, also a system for interacting with vessel images, the system comprising: an image acquisition device; and a device for interacting with vessel images according to the above description; wherein the image acquisition device is configured to acquire and provide a vessel image; and wherein the device for interacting with vessel images is configured to receive the vessel image.

According to an example, the image acquisition device is configured to provide two-dimensional image data of a vessel image, wherein the image acquisition device is an angiography device.

In an example, the two-dimensional image acquisition device may be an ultrasound device.

In another example, the image acquisition device is a three-dimensional image acquisition device, preferably a three-dimensional X-ray image acquisition device, more preferably a CT device, a MR device, a PET device, or a SPECT device, wherein the three-dimensional image acquisition device provides a 2D slice of a 3D data set or a 2D projection of a 3D data set is provided.

According to the present invention, also a method for interacting with vessel images is provided, the method comprising the following steps: a) Displaying a vessel image on a display of an interface unit; b) Determining, for at least one vessel in the vessel image, a vessel contour; c) Determining, from the user input, an identifier position in the vessel image; d) Indicating at least a portion of the vessel contour in the vessel image, if the determined identifier position is spaced apart from the vessel contour by a distance within a predefined distance range; e) Determining, from the user input, a drag direction; and f) Moving the indicated portion along the contour based on the determined drag direction.

According to the present invention, also a computer program element for controlling a device according to the above description or a system according to the above description is provided, which, when being executed by a processing unit, is adapted to perform the method steps according to the above description.

According to the present invention, also a computer readable medium having stored the program element according to the above description is provided.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
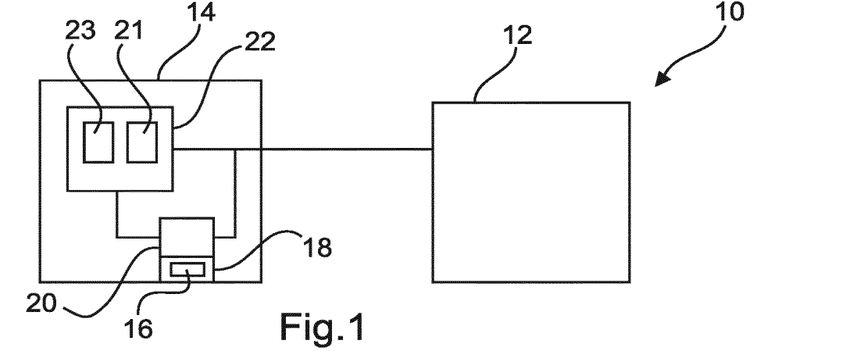
FIG. 1 shows a schematic drawing of the device.

FIG. 1 shows a system 10 for interacting with vessel images comprising an image acquisition device 12 and a device 14 for interacting with vessel images. The image acquisition device 12 is configured to acquire and provide a vessel image 24. The device 14 for interacting with vessel images is configured to receive the vessel image 24. The vessel image 24 may depict at least one vessel 26. The vessel 26 in the vessel image 24 may be replaced by a reformatted vessel, a vessel centreline by a reformatted vessel centreline, and/or the vessel contour by a reformatted vessel contour. Furthermore, the vessel image 24 may show a straightened curvilinear reformatting of vessel anatomy.

In an exemplary embodiment, the image acquisition device 12 may provide two-dimensional image data of the vessel image 24, wherein the image acquisition device 12 is an angiography device.

In further exemplary embodiments, two-dimensional image data may be extracted from image data being acquired by an ultrasound device, a CT device, a MR device, a PET device, or a SPECT device. The two-dimensional image data may be a two-dimensional slice or a two-dimensional projection of a three-dimensional data set.

Figure 2A:
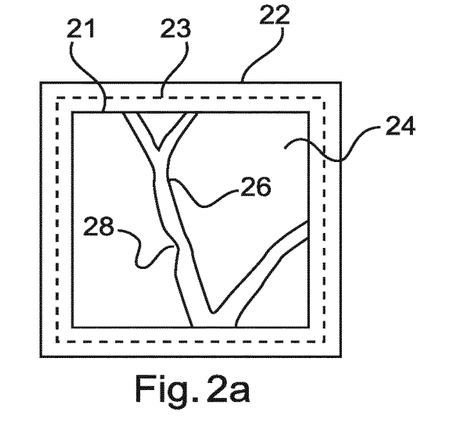
FIG. 2a-h show schematic drawings of the interaction with the vessel image on a touch screen.

The device 14 comprises an interface unit 22, a processing unit 20 and a display 21. After receiving the vessel image 24, the device may display the vessel image 24 on the display 21 as shown in FIG. 2a. A user may interact with the vessel image 24 using the interface unit 22. The user may provide a user input in relation to the vessel image 24 which may be received by the interface unit 22. The user input may comprise an identifier position 36 in the vessel image 24 and further a drag direction 42 being performed by the identifier in the vessel image 24.

In an exemplary embodiment, the interface unit 22 is a touch screen comprising the display 21 and a touch controller 23. When the interface unit 22 is a touch screen, the identifier in the vessel image 24 may be a user's finger which touches the touch screen. The surface of the touch screen is then monitored and a touch interaction may be received and processed by the touch controller 23. However, this does not exclude another body part of the user that may be used for touching the touch screen.

The touch controller 23 of the touch screen may then detect the touch position of the user's finger as identifier position 36 on the vessel image 24. The processing unit 20 may register the detected position on the touch screen to a position in the vessel image 24. If the user then performs a drag movement the identifier on the touch screen, the touch controller 23 will detect the drag direction 42.

Figure 2B:
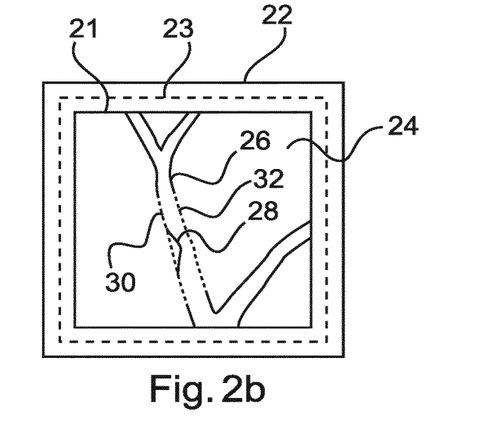

The processing unit 20 may determine a vessel contour 30 of the at least one vessel 26 in the vessel image 24, according to FIG. 2b. Furthermore, the processing unit 20 may provide an indication of just a part of the vessel contour 30 in the vessel image 24. The indicated part of the vessel contour 30 may be shown in the vessel image 24 on the display 21. Moreover, the processing unit 20 may determine a further vessel contour 32 in the vessel image 24. The further vessel contour 32 may be positioned opposite to the vessel contour 30 at the vessel 26.

In FIG. 2b, it is furthermore shown that the determined vessel contour 30 does not follow the real structure of the vessel 26 in the vessel image 24, wherein the vessel 26 comprises a stenosis 28. As can be seen, the determined vessel contour 30 does not follow the stenosis 28. In this case, the processing unit 20 allows a user to correct the vessel contour 30.

Figure 2C:
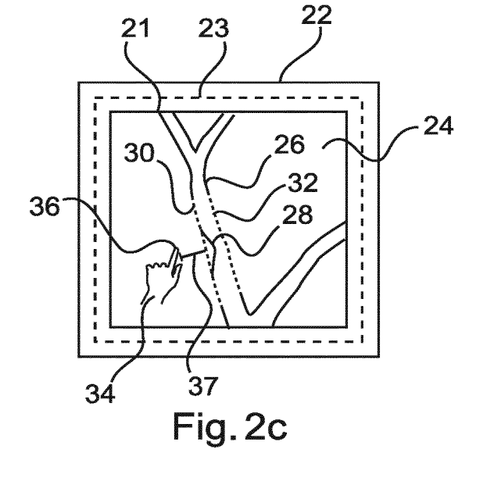

According to FIG. 2c, a user may touch the touch screen of the interface unit 22 with his finger 34 and provide a user input. The touch position defines the identifier position 36 in the vessel image 24 which may be determined by the processor unit 20 via the touch controller 23, i.e. in this embodiment by the touch screen.

Figure 2D:
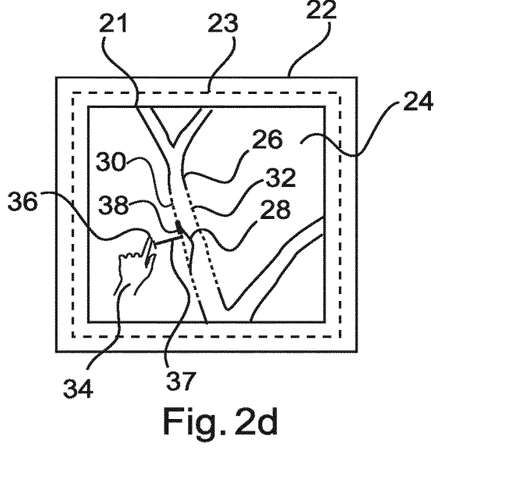

If the identifier position 36 is spaced apart from the vessel contour 30 by a distance 37 which may be in a predefined distance range the processing unit will indicate at least a portion 38 of the vessel contour 30 in the vessel image 24, as shown in FIG. 2d. The predefined distance range within which the distance 37 may range from 1 mm to 50 mm, preferably from 2 mm to 40 mm, more preferably from 3 mm to 30 mm, most preferably from 4 mm to 20 mm from the vessel contour 30. Preferably, only if the distance 37 is within this predefined distance range will the processing unit 20 indicate at least a portion 38 of the vessel contour 30 in the vessel image 24.

Figure 2E:
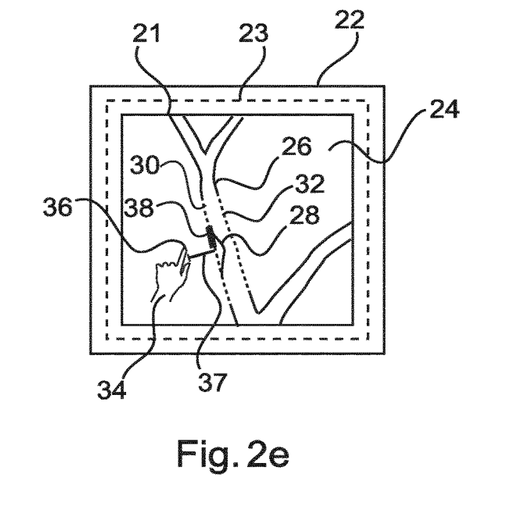

As long as the user does not move the finger from the indicator position 36, the indicated portion 38 of the vessel contour 30 will increase its length as shown in FIG. 2e. As soon as the user starts to drag the finger from the identifier position 36, the increase of the length of the indicated portion 38 will take place. This means, that the period of increasing the length of the indicated portion 38 begins with the detection of the identifier position 36 and ends with the detection of the drag direction 42. The growth rate of the increase may be predefined and be chosen such that the user can accurately define the size of the indicated portion 38 on the vessel contour 30.

Figure 2F:
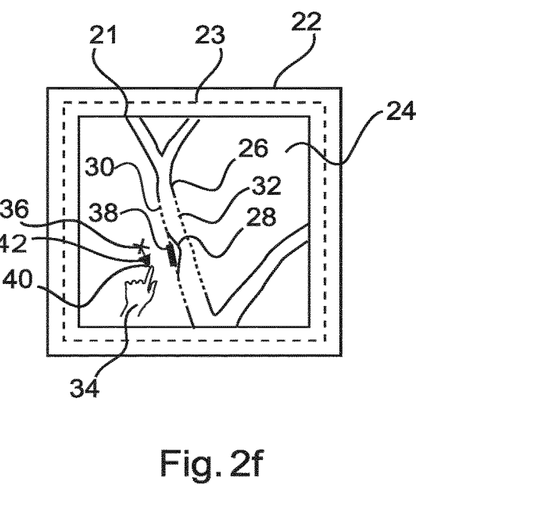

The drag direction 42 may be detected by the touch controller 23 and determined by the processor unit 20. Upon detection of the drag direction 42, the processing unit 20 will determine the angle between the drag direction and the indicated portion 38 of the vessel contour 30. If the result of the angle determination is within a first predefined angle range 33, the indicated portion 38 of the vessel contour 30 will be moved along the vessel contour 30 by the processor unit 20. The movement follows the identifier, i.e. the user's finger, in the drag direction 42, as is shown in FIG. 2*f*. In this exemplary embodiment, the user may drag his finger from the identifier position 36 to the position 40 in the vessel image 24. Between FIG. 2*e* and FIG. 2*f*, the indicated portion 38 moves along the vessel contour 30 from the beginning of the stenosis 28 to substantially the center of the stenosis 28.

Figure 2G:
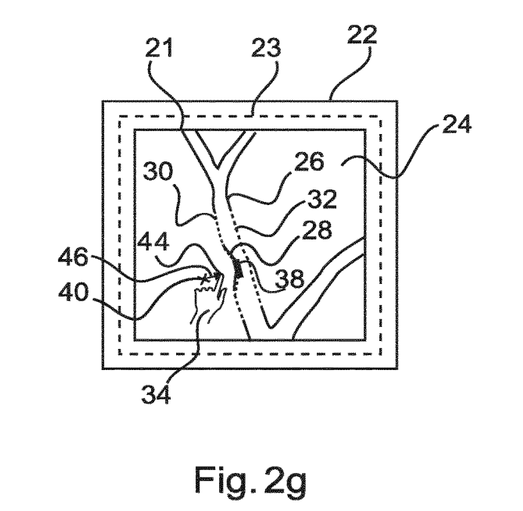

FIG. 2*g* shows a change of the drag movement into a direction 46 from the position 40 to the position 44 wherein the drag movement along the direction 46 may be received by touch controller 23. Upon the determination of the drag movement along the direction 46, the processing unit 20 will determine whether the angle between the direction 46 and the indicated portion 38 is within a second predefined angle range 35. If the determined angle is within the second predefined angle range 35 the vessel contour 30 is default at and/or around the position of the indicated portion 38. The deformation may be such that the indicated portion 38 will move perpendicular to the earlier extension of vessel contour 30. The connection to the remaining vessel contour 30 is adapted to the movement of the indicated portion 38.

As can be seen in FIG. 2*g*, the deformed vessel contour 30 still differs from the stenosis 28. The user may perform a further change of the drag movement into the direction 48 starting at the position 44. If the angle between the drag movement along the direction 48 and the indicated portion 38 is in the range of the first predefined angle range 33, the indicated portion 38 will move with the deformed vessel contour 30 along the vessel contour 30 based on the direction 48. The deformed portion of the vessel contour 30 may then be moved along the vessel contour 30. This may result in an exact covering of the contour of the stenosis 28 such that the vessel contour 30 exactly covers the structure of the vessel 26 in the vessel image 24.

Figure 3:
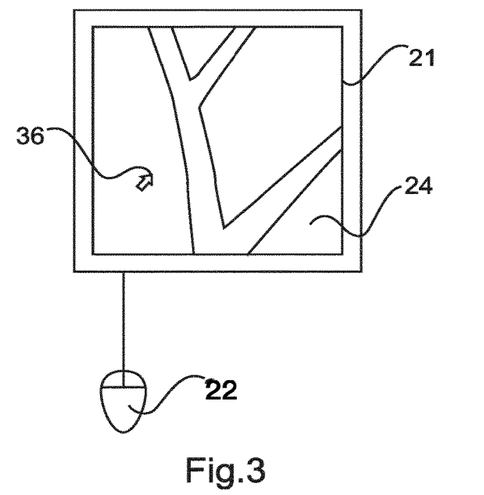
FIG. 3 shows a schematic drawing of a mouse as input setup.
Figure 4:
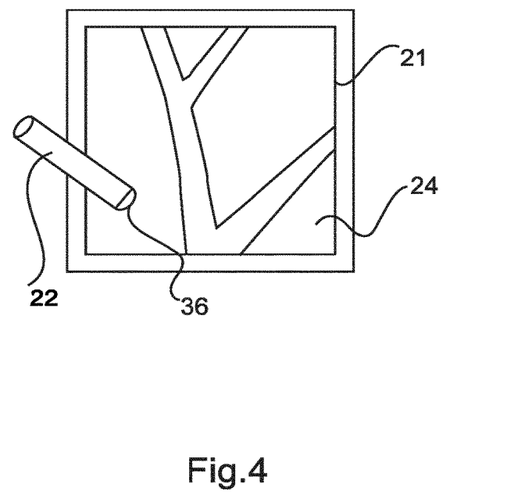
FIG. 4 shows a schematic drawing of an electronic pen as input setup.

In further exemplary embodiments of the interface unit 22 according to FIGS. 3 and 4, the interface unit 22 may comprise a mouse, or an electronic pen.

In FIG. 3, the interface unit 22 comprises a mouse and a click interaction with the pointer on the vessel image 24 being shown on the display 21 defines the identifier position 36. A drag direction 42 may be input by dragging the pointer during clicking the mouse.

In FIG. 4, the interface unit 22 comprises an electronic pen. The contact position of the electronic pen on the display 21 may define the identifier position 36 in the vessel image 24. The drag direction 42 may be input by dragging the contacted electronic pen along the vessel image 24.

Figure 5:
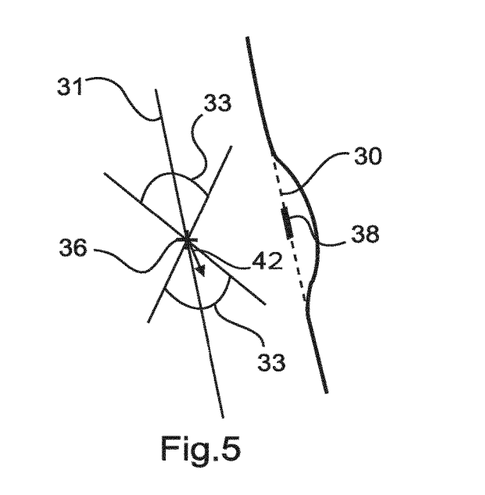
FIG. 5 shows a schematic drawing of a first angle range.

FIG. 5 shows the vessel contour 30 with the indicated portion 38. A line 31 being parallel to the indicated portion 48 is depicted for explaining the determination of the angle between the drag movement and the indicated portion 38. The line 31 intersects the identifier position 36. The drag movement in the drag direction 42 is also indicated. Furthermore shown is the first predefined angle range 33. The drag direction 42 has an angle which is within the first predefined angle range 33. This may lead to a movement of the indicated portion 38 along the vessel contour 30 if no deformation of the vessel contour 30 has been performed, yet. If the deformation of the vessel contour 30 has already been performed, the whole deformed vessel contour 30 will move with the indicated portion 38 along the vessel contour 30. Although the direction 42 points to the bottom of FIG. 5, it is not excluded that the direction 42 may also point to the top of FIG. 5. The indicated portion 38 may therefore move in both directions along the vessel contour 30.

The first predefined range may range from +45° to −45° and +135° to −135°, preferably from +30° to −30° and +150° to −150°, more preferably from +15° to −15° and +165° to −165°, most preferably at 0° and 180°, wherein 0° and 180° are parallel to the contour.

Figure 6:
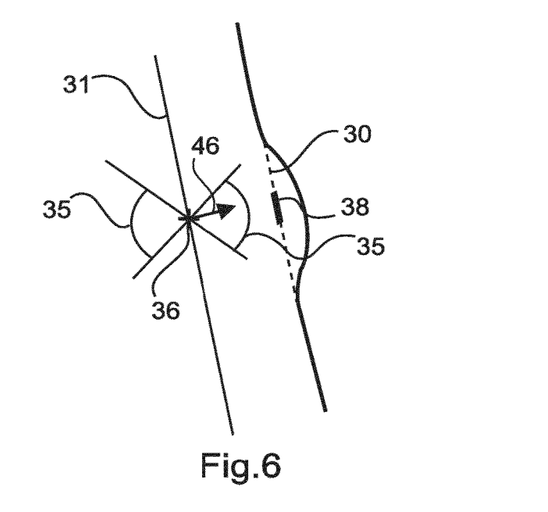
FIG. 6 shows a schematic drawing of a second angle range.

FIG. 6 shows the second predefined angle range 35. The direction 46 denotes a drag direction 42 towards the vessel contour 30 which may start at the identifier position 36. If the angle between the direction 46 and the line 31 is within the second predefined angle range 35, the indicated portion 38 will move perpendicularly to the vessel contour 30 which will lead to a deformation of the vessel contour 30. Although the direction 46 points to the right in FIG. 6, it is not excluded that the direction 46 may point to the left. This will lead to a deformation of the vessel contour 30 to the left.

The second predefined angle range may range from +45° to +135° and from −45° to −135°, preferably from +30° to +120° and from −30° to −120°, more preferably from +15 to +105° and from −15° to −105°, most preferably at +90° and at −90°, i.e. be perpendicular to the contour.

Figure 7:
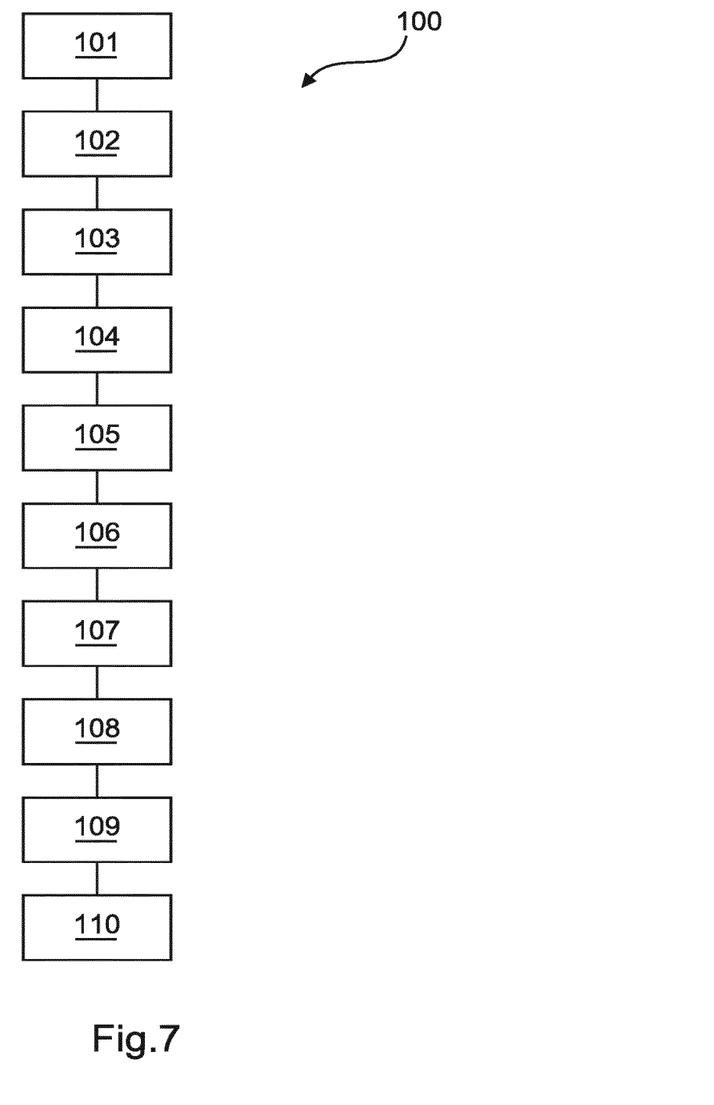
FIG. 7 shows a schematic drawing of a flow chart of the method.

FIG. 7 shows a diagram indicating method steps 101 to 110 of a method 100 for interacting with vessel images. The method 100 may be performed with a device 14 for interacting with vessel images or a system 10 for interacting with vessel images according to FIG. 1. In the following the method steps of FIG. 7 are described with references to FIGS. 2*a* to 2*h*. In an embodiment, the method is a computer-implemented method.

The method comprises a step 101 of displaying the vessel image 24 on the display 21 of the device 14, as shown in FIG. 2*a*.

In a determining step 102, a vessel contour 30 of the at least one vessel 26 in the vessel image 24 is determined, as shown in FIG. 2*b*. The determination may be performed with a processing unit 20. Moreover, a further vessel contour 32 in the vessel image 24 may be determined. The further vessel contour 32 may be positioned opposite to the vessel contour 30 at the vessel 26.

The vessel 26 may comprise a stenosis 28. As can be seen in FIG. 2*b*, the determined vessel contour 30 does not follow the stenosis 28. In this case, the method allows a user to correct the vessel contour 30.

In a further determining step 103, a touch position of a user input which is defined by the identifier position 36 in the vessel image 24 may be determined by the processor unit 20 via a touch controller 23 as shown in FIG. 2*c*.

In an indicating step 104, if the identifier position 36 is spaced apart from the vessel contour 30 by a distance 37 in the predefined distance range, at least a portion 38 of the vessel contour 30 in the vessel image 24 may be indicated, as shown in FIG. 2*d*.

In a detecting step 105, a drag interaction may be detected by the touch controller 23 and, in a further determining step 106, the drag direction 42 of the detected drag interaction may be determined by the processor unit 20. In an example, an angle between the drag direction and the currently indicated portion 38 of the vessel contour 30 is established.

In case a touch interaction occurs at the identifier position 36 but the touch controller does not yet detect any drag interaction, for example, the processor unit 20 may increase a length of the indicated portion 38. The growth rate of the increase may be predefined and be chosen such that the user can accurately define the size of the indicated portion 38 on the vessel contour 30.

In a moving step 107, if the result of the angle determination is within a first predefined angle range 33, the indicated portion 38 of the vessel contour 30 will be moved along the vessel contour 30 by the processor unit 20. The movement follows the identifier, i.e. the user's finger, in the drag direction 42, as is shown in FIG. 2f. In this exemplary embodiment, the user may drag his finger from the identifier position 36 to the position 40 in the vessel image 24.

In an optional further moving step 108, if the determined angle changes to an angle within the second predefined angle range 3, the vessel contour 30 may deform such that the indicated portion 38 will move 108 perpendicular to the earlier extension of vessel contour 30, as shown in FIG. 2g. The connection to the remaining vessel contour 30 is adapted to the movement of the indicated portion 38.

Figure 2H:
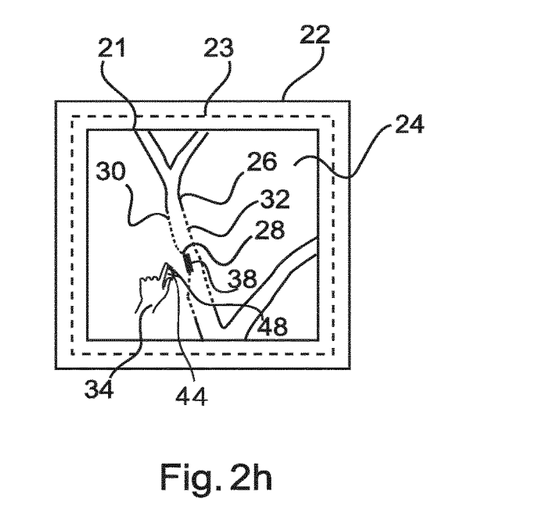

Optionally, if a user finds that the deformed vessel contour 30 still differs from the stenosis 28, in a further moving step 109, the user may perform a further change of the drag movement into the direction 48 starting at the position 44, causing the indicated portion 38 of the deformed vessel contour 30 to move based on the direction 48, as shown in FIG. 2h.

By optionally repeating the moving steps, in an optional storing step 110, when a user established that a sufficient covering of the contour of a stenosis 28 by the indicated vessel contour has been achieved, the final position and shape of the indicated vessel contour may be stored for subsequent use, for example, in a geometric or functional vessel analysis tool.

In another exemplary embodiment of the present invention, a computer program or a computer program element 16 is provided that is characterized by being adapted to execute the method steps of the method according to one of the preceding embodiments, for example on an appropriate device as described with reference to FIG. 1.

The computer program element 16 might therefore be stored on a computer unit, which might also be part of an embodiment of the present invention. For example, the computer program may be executed by the processing unit 20 of a device as described with reference to FIG. 1.

This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, as shown in FIG. 1, a computer readable medium 18, such as a CD-ROM, is presented wherein the computer readable medium has a computer program element stored on it which computer program element 16 is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A device for interacting with vessel images, the device comprising:
   a display configured to display a vessel image;
   an interface configured to receive a user input in relation to the vessel image; and
   at least one processor configured to:
      determine, for at least one vessel in the vessel image, a vessel contour,
      determine, from the user input, an identifier position in the vessel image, wherein the user input defines the identifier position with an identifier on the vessel image,
      indicate a portion of the vessel contour in the vessel image based on the determined identifier position, if the determined identifier position is spaced apart from the vessel contour by a predefined distance,
      determine, from the user input, a drag direction, wherein the user input defines the drag direction by a drag movement of the identifier, and
      move the indicated portion along the vessel contour based on the determined drag direction.

2. The device according to claim 1, wherein the at least one processor is further configured to increase a length of the indicated portion of the vessel contour with a predefined growth rate before determining the drag direction,
wherein a period of increasing the length begins with detection of the identifier position and ends with detection of the drag direction.

3. The device according to claim 1, wherein the interface is a touch screen comprising the display, and wherein the user input takes place by a touch interaction on the display within the vessel image.

4. The device according to claim 1, wherein the interface comprises a mouse and/or an electronic pen.

5. The device according to claim 1, wherein the predefined distance is within a predefined distance range that ranges from 1 mm to 50 mm.

6. The device according to claim 1, wherein the at least one processor is further configured to:
move the indicated portion along the vessel contour while an angle between the determined drag direction and the indicated portion is within a first predefined angle range.

7. The device according to claim 6, wherein the first predefined angle range ranges from +45° to −45° and +135° to −135°.

8. The device according to claim 6, wherein the at least one processor is further configured to deform the vessel contour at the indicated portion while the angle between the determined drag direction and the indicated portion is within a second predefined angle range, resulting in a deformed indicated portion of the vessel contour in the vessel image.

9. The device according to claim 8, wherein the at least one processor is further configured to move the deformed indicated portion along the vessel contour in the vessel image while the angle between the determined drag direction and the indicated portion is within the first predefined angle range after deforming the vessel contour.

10. The device according to claim 8, wherein the second predefined angle range ranges from +45° to +135° and from −45° to −135°.

11. A system for interacting with vessel images, the system comprising:
the device for interacting with the vessel images according to claim 1; and
an image acquisition device configured to acquire and provide the vessel images to the device for interfacing with the vessel images.

12. The system according to claim 11, wherein the image acquisition device is configured to provide two-dimensional image data of the vessel images, and wherein the image acquisition device is an angiography device.

13. A method for interacting with vessel images, the method comprising:
displaying a vessel image on a display;
determining, for at least one vessel in the vessel image, a vessel contour;
determining, from a user input, an identifier position in the vessel image, wherein the user input defines the identifier position with an identifier on the vessel image;
indicating a portion of the vessel contour in the vessel image based on the determined identifier position, if the determined identifier position is spaced apart from the vessel contour by a predefined distance;
determining, from the user input, a drag direction, wherein the user input defines the drag direction by a drag movement of the identifier; and
moving the indicated portion along the vessel contour based on the determined drag direction.

14. The method according to claim 13, wherein the predefined distance is within a predefined distance range that ranges from 1 mm to 50 mm.

15. A non-transitory computer-readable storage medium having stored a computer program comprising instructions for controlling a device for interacting with vessel images, the instructions, when executed by a processor, cause the processor to:
display a vessel image on a display;
determine, for at least one vessel in the vessel image, a vessel contour;
determine, from a user input, an identifier position in the vessel image, wherein the user input defines the identifier position with an identifier on the vessel image;
indicate a portion of the vessel contour in the vessel image based on the determined identifier position, if the determined identifier position is spaced apart from the vessel contour by a predefined distance;
determine, from the user input, a drag direction, wherein the user input defines the drag direction by a drag movement of the identifier; and
move the indicated portion along the vessel contour based on the determined drag direction.

16. The non-transitory computer-readable storage medium according to claim 15, wherein the predefined distance is within a predefined distance range that ranges from 1 mm to 50 mm.

* * * * *